United States Patent
Chen et al.

(10) Patent No.: US 9,003,777 B2
(45) Date of Patent: Apr. 14, 2015

(54) METHODS AND SYSTEMS FOR AN EXHAUST GAS TREATMENT SYSTEM

(71) Applicant: Ford Global Technologies, LLC, Dearborn, MI (US)

(72) Inventors: Shikui Kevin Chen, Canton, MI (US); Kirk Andrew Parrish, Grass Lake, MI (US); Joseph Goode, Northville, MI (US); Jeffrey Malcolm Travis, Dexter, MI (US); Norman Hiam Opolsky, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 13/759,919

(22) Filed: Feb. 5, 2013

(65) Prior Publication Data

US 2014/0216008 A1    Aug. 7, 2014

(51) Int. Cl.
| | |
|---|---|
| F01N 3/00 | (2006.01) |
| F01N 9/00 | (2006.01) |
| F01N 3/10 | (2006.01) |
| F01N 3/20 | (2006.01) |
| F02B 37/00 | (2006.01) |

(52) U.S. Cl.
CPC .............. *F01N 9/002* (2013.01); *F01N 3/106* (2013.01); *F01N 3/2066* (2013.01); *F02B 37/00* (2013.01); *F01N 2430/08* (2013.01); *F01N 2550/04* (2013.01); *F01N 2560/025* (2013.01); *F01N 2560/05* (2013.01); *F01N 2560/08* (2013.01); *F01N 2570/12* (2013.01); *F01N 2900/0416* (2013.01); *F01N 2900/1606* (2013.01)

(58) Field of Classification Search
CPC ....... F01N 3/0842; F01N 3/035; F01N 13/02; F01N 9/002; F02D 41/0275; F02D 41/1441; F02D 41/0295; F02D 41/029
USPC .................... 60/273, 274, 285, 286, 295, 311
See application file for complete search history.

(56) References Cited

U.S. PATENT DOCUMENTS

| | | | | |
|---|---|---|---|---|
| 2002/0078681 | A1* | 6/2002 | Carberry et al. ................. | 60/280 |
| 2003/0167756 | A1* | 9/2003 | Szymkowicz .................. | 60/289 |
| 2007/0199312 | A1* | 8/2007 | Kapparos et al. ............... | 60/297 |
| 2009/0056310 | A1* | 3/2009 | Xu et al. ......................... | 60/274 |
| 2009/0288398 | A1* | 11/2009 | Perfetto et al. .................. | 60/287 |
| 2010/0024395 | A1* | 2/2010 | Gotou et al. .................... | 60/277 |
| 2011/0239623 | A1* | 10/2011 | Leustek et al. ................. | 60/274 |
| 2012/0294771 | A1* | 11/2012 | Choi .............................. | 422/170 |

* cited by examiner

*Primary Examiner* — Thomas Denion
*Assistant Examiner* — Patrick Maines
(74) *Attorney, Agent, or Firm* — Julia Voutyras; Alleman Hall McCoy Russell & Tuttle LLP (57) ABSTRACT

Various systems and methods are described for an engine system with an exhaust gas treatment system including a particulate filter. In one example method, accumulated hydrocarbons are removed from the exhaust gas treatment system by increasing an exhaust gas temperature to a first temperature responsive to a particulate filter regeneration request during extended cold idle operation. After a predetermined duration, the exhaust gas temperature is increased to a second, higher temperature to regenerate the particulate filter.

19 Claims, 6 Drawing Sheets

METHODS AND SYSTEMS FOR AN EXHAUST GAS TREATMENT SYSTEM

TECHNICAL FIELD

The present application relates generally to regeneration of an exhaust gas treatment system positioned in an exhaust system of an internal combustion engine.

BACKGROUND AND SUMMARY

An exhaust gas treatment system may be included in an exhaust system of an engine in a vehicle in order to reduce regulated emissions. In one example, the exhaust gas treatment system may include a diesel particulate filter (DPF) and a diesel oxidation catalyst (DOC). An exhaust gas temperature may be increased periodically in order to burn accumulated soot in the DPF in a process known as DPF regeneration. During some conditions, such as extended cold idling, unburned hydrocarbons from the engine may accumulate in the exhaust gas treatment system and may be unaccounted for. During a subsequent DPF regeneration, the accumulated unburned hydrocarbons may burn rapidly. Exothermic heat from the burning hydrocarbons is uncontrolled and un-metered, resulting in excessively high temperatures in the exhaust system which may lead to degradation of the DPF and/or DOC.

The inventors herein have recognized the above issue and have devised an approach to at least partially address it. Thus, a method for an exhaust system is disclosed. The method includes, in response to extended cold idle operation, and in response to a particulate filter regeneration request, first removing hydrocarbons stored in the particulate filter, and then performing the particulate filter regeneration.

In one example, an exhaust gas temperature may be increased to a first temperature, but less than a second temperature, in order to remove the hydrocarbons by desorbing them, and then further increased to the second temperature to initiate regeneration of the particulate filter. A duration the exhaust gas remains at the first temperature may be based on duration of the extended cold idle operation and the exhaust temperature during the idle operation, for example. By removing the hydrocarbons before performing the particulate filter regeneration, degradation of the particulate filter due to burning of the hydrocarbons may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods and systems for an engine system with an exhaust gas treatment system. One example method includes, in response to extended cold idle operation, and in response to a particulate filter regeneration request, first removing hydrocarbons stored in the oxidation catalyst and/or the particulate filter, and then performing the particulate filter regeneration. The hydrocarbons may be removed by increasing an exhaust gas temperature to a first temperature, but less than a second temperature, for a duration based on an amount of time of the extended cold idle operation and the exhaust gas temperature during the idle conditions. Once the hydrocarbons are removed, the particulate filter regeneration may be initiated by increasing the exhaust gas temperature to the second temperature. In some examples, during non-extended cold idle conditions, particulate filter regeneration may be initiated responsive to regeneration request without first removing the hydrocarbons.

Figure 1:
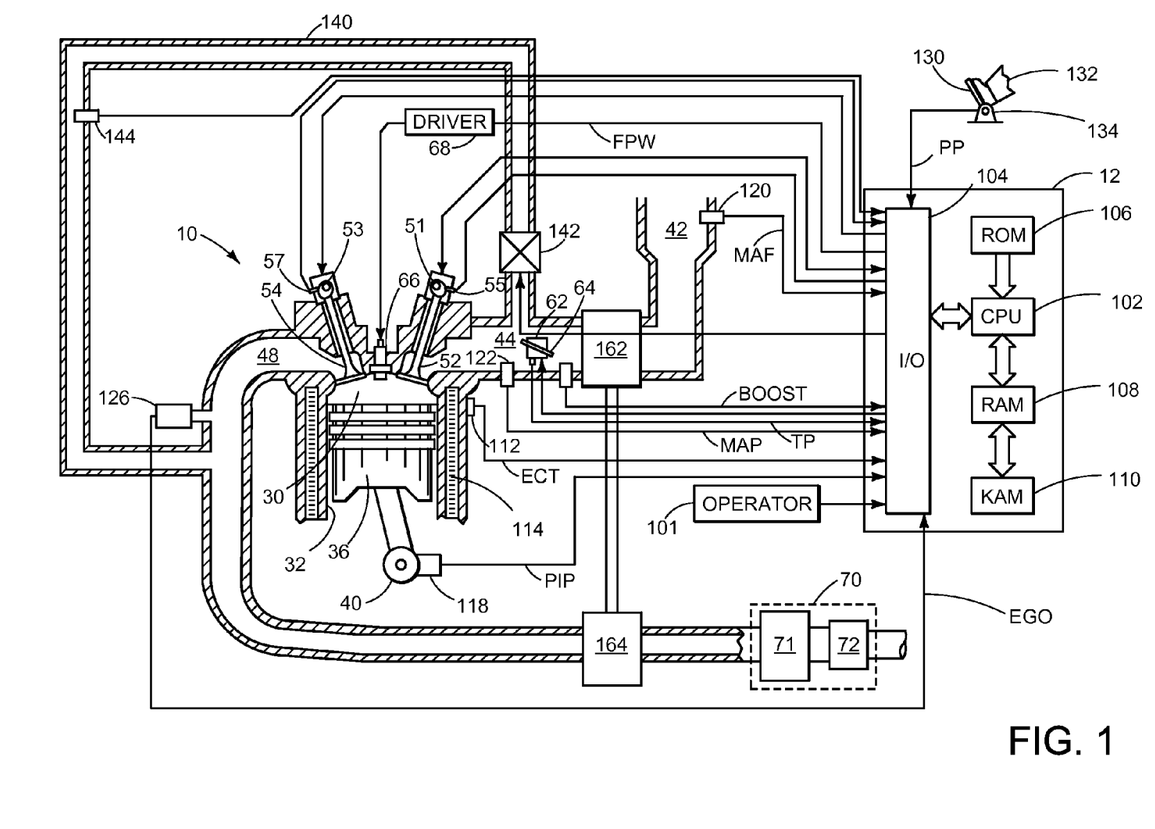
FIG. 1 shows a schematic diagram of an engine including an exhaust gas treatment system positioned in an exhaust system of the engine.

FIG. 1 is a schematic diagram showing one cylinder of a multi-cylinder engine 10, which may be included in a propulsion system of an automobile. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. In some embodiments, the face of piston 36 inside cylinder 30 may have a bowl. Piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

Although only one cylinder 30 is shown in the example depicted in FIG. 1, the engine 10 may include a plurality of cylinders configured to combust a mixture of charge air (e.g., intake air) and fuel, such as diesel, gasoline, alcohol (e.g., ethanol, methanol, etc.), a fuel blend, or another suitable fuel. The combustion chamber 30 may receive intake air from an intake manifold 44 via an intake passage 42 and may exhaust combustion gases via an exhaust passage 48. The intake manifold 44 and exhaust passage 48 can selectively communicate with the combustion chamber 30 via respective intake valve 52 and exhaust valve 54. In some embodiments, the combustion chamber 30 may include two or more intake valves and/or two or more exhaust valves.

The intake valve 52 may be controlled by the controller 12 via an electric valve actuator (EVA) 51. Similarly, the exhaust valve 54 may be controlled by the controller 12 via an EVA 53. Alternatively, the variable valve actuator may be electro hydraulic or any other conceivable mechanism to enable valve actuation. During some conditions, the controller 12 may vary the signals provided to the actuators 51 and 53 to control the opening and closing of the respective intake and exhaust valves. The position of the intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, the cylinder 30 may alternatively include an intake valve controlled via electric valve actuation and an exhaust valve controlled via cam actuation including CPS and/or VCT.

A fuel injector 66 is shown coupled directly to the combustion chamber 30 for injecting fuel directly therein. Fuel injection may be via a common rail system, or other such diesel fuel injection system. Fuel may be delivered to the fuel injector 66 by a high pressure fuel system (not shown) including a fuel tank, a fuel pump, and a fuel rail.

The intake passage 42 may include a throttle 62 having a throttle plate 64. In this particular example, the position of throttle plate 64 may be varied by controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 48 to the intake passage 44 via an EGR passage 140. The amount of EGR provided to the intake passage 44 may be varied by the controller 12 via an EGR valve 142. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As depicted in FIG. 1, the engine 10 further includes a compression device such as a turbocharger or supercharger including at least a compressor 162 arranged along the intake manifold 44. For a turbocharger, the compressor 162 may be at least partially driven by a turbine 164 (e.g. via a shaft) arranged along the exhaust passage 48. For a supercharger, the compressor 162 may be at least partially driven by the engine and/or an electric machine, and may not include a turbine. Thus, the amount of compression provided to one or more cylinders of the engine 10 via a turbocharger or supercharger may be varied by the controller 12.

An exhaust gas sensor 126 is shown coupled to the exhaust passage 48 upstream of an exhaust gas treatment system 70. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

The exhaust gas treatment system 70 is shown arranged along the exhaust passage 48 downstream of the exhaust gas sensor 126. As depicted, the exhaust gas treatment system 70 includes a catalyst 71, such as a diesel oxidation catalyst (DOC) and a particulate filter 72, such as a diesel particulate filter (DPF). In some embodiments, the particulate filter 72 may be located downstream of the catalyst (as shown in FIG. 1), while in other embodiments, the particulate filter 72 may be combined with the catalyst into a single brick system (not shown in FIG. 1). In some embodiments, the exhaust gas treatment system 70 may additionally or alternatively include a selective catalytic reduction (SCR) system, a three way catalyst (TWC), a $NO_x$ trap, various other emission control devices, or combinations thereof.

The particulate filter 72 may be periodically regenerated by raising the temperature of the particulate filter 72 to a predetermined temperature at which soot is oxidized. The temperature of the particulate filter 72 may be increased by increasing the engine exhaust gas temperature, for example. In some examples, the exhaust gas temperature may be increased by adjusting one or more engine operating parameters, such as fuel injection timing, air fuel ratio, spark timing, etc., as will be described in greater detail below. In other embodiments, the exhaust gas temperature may be increased upstream of the particulate filter 72 by injecting fuel into the exhaust passage 48 or upstream of the exhaust gas treatment system 70.

Further, during some operating conditions, such as during extended cold idle conditions, excess hydrocarbons may accumulate in the exhaust gas treatment system 70. Because the excess hydrocarbons may burn, resulting in degradation of the components of the exhaust gas treatment system 70, the accumulated hydrocarbons may be removed in a hydrocarbon desorption process before regeneration of the particulate filter 72 is carried out. The hydrocarbon desorption process may include increasing the exhaust gas to a first temperature, which is less than a second temperature. As one non-limiting example, the first temperature may be between 250 and 350° C. After a predetermined duration at the first temperature, which will be described in greater detail below, the exhaust gas temperature may be increased to a second temperature such that regeneration is initiated. As a non-limiting example, the second temperature may be 600° C.

Continuing with FIG. 1, the controller 12 is shown in FIG. 1 as a microcomputer, including a microprocessor unit 102, input/output ports 104, an electronic storage medium for executable programs and calibration values shown as read only memory chip 106 in this particular example, a random access memory 108, a keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; and absolute manifold pressure signal, MAP, from the sensor 122. Engine speed signal, RPM, may be generated by the controller 12 from signal PIP, for example. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft.

Further, the controller 12 may receive input from an operator 101 of a vehicle in which the engine 10 is disposed. As an example, the operator 101 may request a manual regeneration of the particulate filter 72, as will be described in greater detail below. Responsive to the manual request for regeneration, the controller may adjust one or more engine operating parameters in order to increase the exhaust gas temperature to a temperature suitable for hydrocarbon desorption or particulate filter regeneration.

The storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Figure 2:
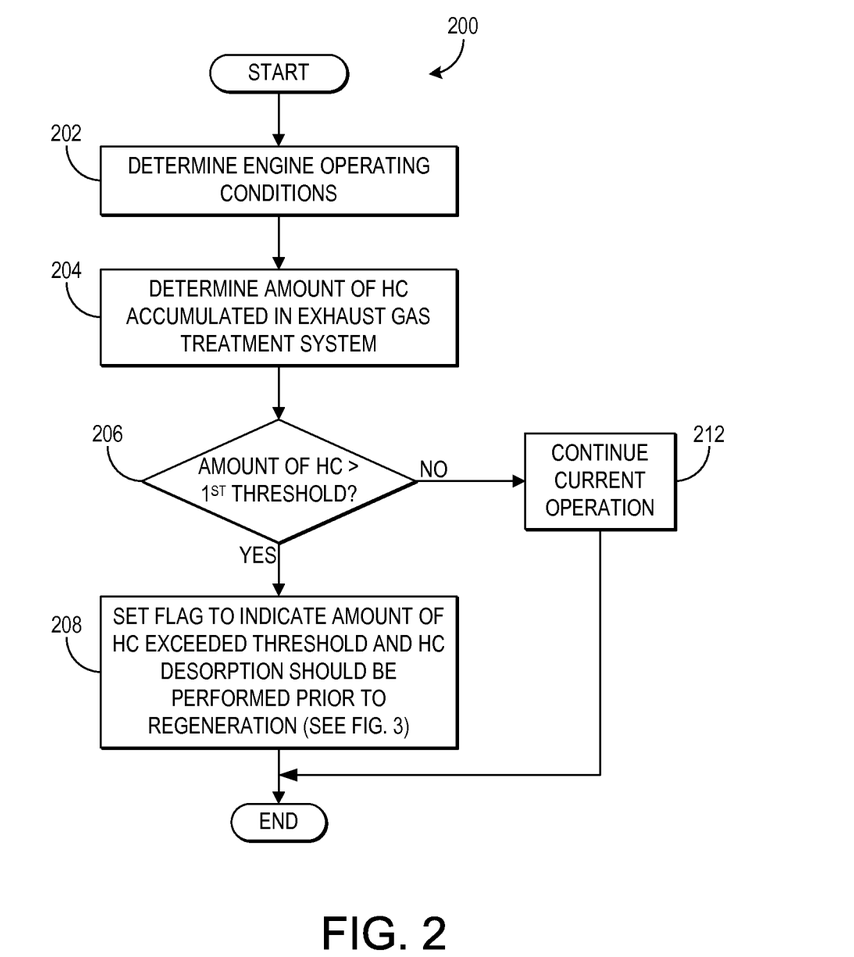
FIG. 2 shows a routine for determining an amount of hydrocarbons in an exhaust gas treatment system has exceeded a threshold amount.
Figure 3:
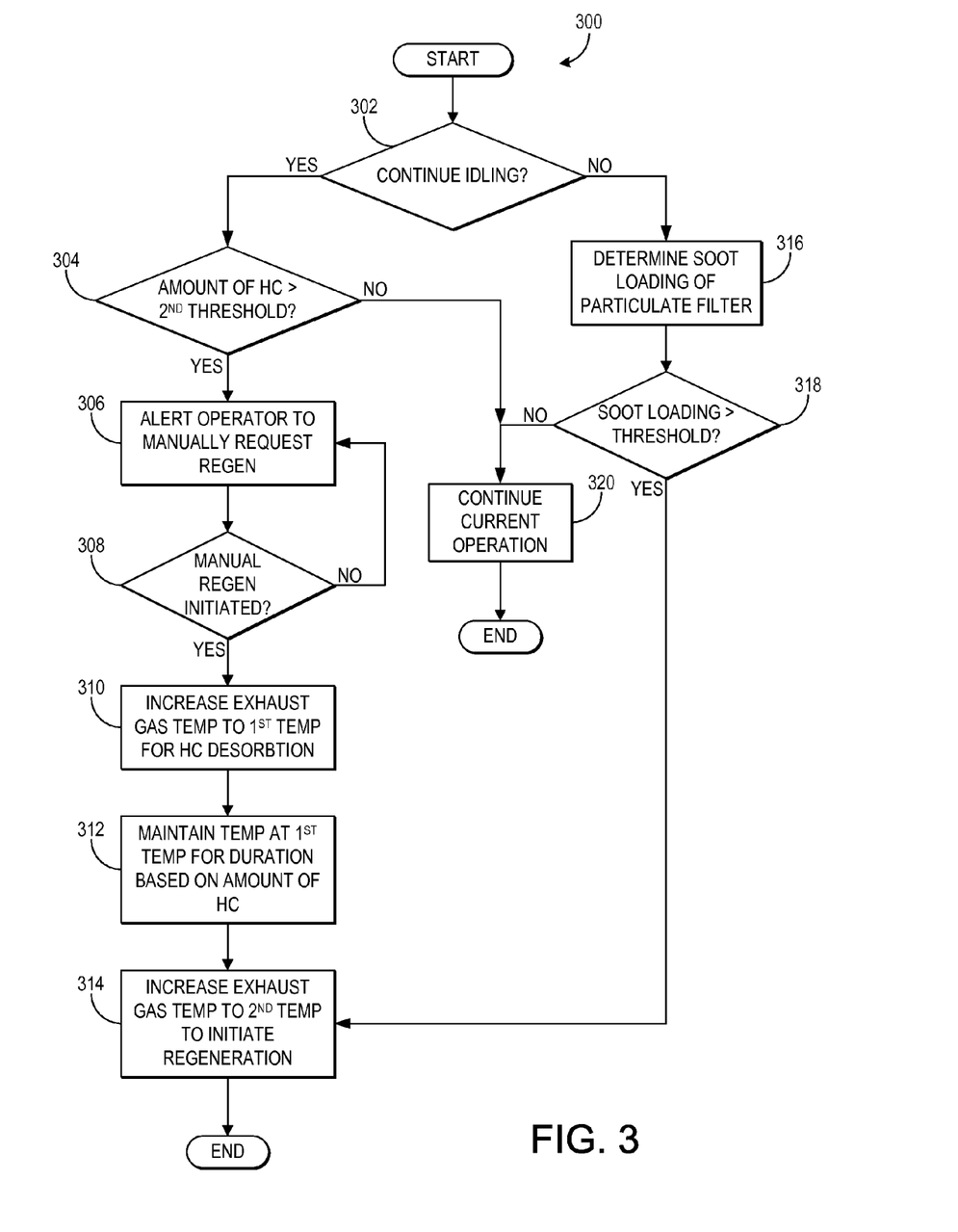
FIG. 3 shows a routine for removing hydrocarbons from a particulate filter and regenerating the particulate filter.

FIGS. 2 and 3 show flow charts illustrating routines for determining if an amount of hydrocarbons stored in an exhaust gas treatment system is greater than a threshold and for regenerating a particulate filter, respectively. The routine shown in FIG. 2 may be carried out and used to determined that hydrocarbon desorption needs to occur before the particulate filter may be regenerated at a high temperature. As such, the routines shown in FIGS. 2 and 3 may be used together, as information determined via the routine shown in FIG. 2 may be used with the routine shown in FIG. 3.

Referring now to FIG. 2, a routine 200 for determining an amount of hydrocarbons in an exhaust gas treatment system, such as the exhaust gas treatment system 70 described above with reference to FIG. 1, has exceeded a threshold amount is shown. Specifically, the routine determines if a hydrocarbon desorption process is necessary based on the amount of hydrocarbons stored in the exhaust gas treatment system.

At 202, engine operating conditions are determined. As non-limiting examples, engine operating conditions may include engine speed, air fuel ratio, exhaust gas temperature, etc.

Once the operating conditions are determined, the routine continues to 204 where an amount of hydrocarbons accumulated in the exhaust gas treatment system and stored in the exhaust gas treatment system is determined. The amount of hydrocarbons may be determined based on a duration of preceding idle engine operation since the last regeneration and an exhaust gas temperature during the idle operation. For example, the longer the idle operation and the lower the exhaust gas temperature, the greater the amount of hydrocarbon accumulation.

Once the amount of hydrocarbons is determined, the routine proceeds to 206 to determine if the amount of hydrocarbons is greater than a first threshold amount. The first threshold amount may correspond to a particular loading of the particulate filter. For example, the threshold amount may correspond to a 10% loading of the particulate filter. In other examples, the threshold may correspond to a less than 10% loading or a greater than 10% loading of the particulate filter.

If it is determined that the amount of hydrocarbons is not greater than the first threshold amount, the routine moves to 212 and current operation is continued. On the other hand, if it is determined that the amount of hydrocarbons is greater than the first threshold amount, the routine continues to 208 where a flag is set to indicate the amount of hydrocarbons has exceeded the first threshold amount and hydrocarbon desorption should be performed prior to regeneration of the particulate filter when and if regeneration is triggered, as described in detail with reference to FIG. 3. The hydrocarbon desorption process includes increasing the exhaust gas temperature to a first temperature, which is less than a temperature at which particulate filter regeneration occurs, such that the hydrocarbons may be removed to prevent them from burning during regeneration, for example.

Continuing to FIG. 3, it shows a routine 300 for regeneration of a particulate filter, such as the particulate filter 72 described above with reference to FIG. 1. Specifically, the routine determines whether the engine is under continued idle conditions, such as extended cold idle conditions, and carries out regeneration of the particulate filter accordingly. For example, when the engine is under extended cold idle conditions, a hydrocarbon desorption process is performed first, before the particulate filter regeneration, in order to remove accumulated hydrocarbons.

At 302, it is determined if the engine is under continued idle. As an example, continued idle conditions may include extended cold idle conditions. Extended cold idle conditions include engine operation in which the engine is operated a speed below a threshold speed with an exhaust gas temperature less than a threshold temperature for a duration greater than a threshold duration, for example.

If it is determined that the engine is under extended cold idle conditions, the routine proceeds to 304 and it is determined if the amount of hydrocarbons is greater than a second threshold amount, the second threshold amount greater than the first threshold amount described above with reference to FIG. 2. For example, the amount of hydrocarbons may be determined based on the duration of the extended cold idle conditions and a temperature of the exhaust gas during the extended cold idle conditions. Further, the second threshold amount may vary with an amount of soot loading. If it is determined that the amount of hydrocarbons is less than the second threshold amount, the routine moves to 320 and current operation is continued.

On the other hand, if it is determined that the amount of hydrocarbons is greater than the second threshold amount, the routine continues to 306 where an operator of the vehicle is alerted to manually request regeneration or drive to clean. As one non-limiting example, the operator may be alerted via an indicator light on a dashboard of the vehicle.

At 308, it is determined if the manual regeneration has been initiated or auto regeneration has been triggered. If neither manual regeneration nor auto regeneration has been initiated, the routine returns to 306. Instead, if either a manual regeneration has been initiated by the operator or auto regeneration has been triggered, the routine proceeds to 310 and the exhaust gas temperature is increased to a first temperature such that the hydrocarbons may be desorbed. As one example, the first temperature may be between 250 and 350° C. As another example, the exhaust temperature may be between 300 and 400° C. At the first temperature, the hydrocarbons may be desorbed from the exhaust gas treatment system such that, during subsequent particulate filter regeneration, the hydrocarbons will not burn and possibly degrade the components of the exhaust gas treatment system. In some examples, the exhaust gas temperature may be increased to the first temperature for hydrocarbon desorption when auto regeneration is triggered based on soot loading (shown in FIG. 5 below).

As described above, the exhaust gas temperature may be increased by adjusting one or more engine operating parameters. As one example, the exhaust gas temperature may be increased to the first temperature by retarding fuel injection timing. As other examples, the exhaust temperature may be increased to the first temperature by adjusting spark timing or by increasing the engine speed. In some embodiments, only one operating parameter may be adjusted to increase the exhaust gas temperature to the first temperature, while in other embodiments, more than one operating parameter may be adjusted.

At 312 of routine 300, the exhaust gas temperature is maintained at the first temperature for a duration based on the amount of stored or accumulated hydrocarbons. The amount of stored hydrocarbons may be determined via routine 200 described above with reference to FIG. 2. For example, the duration may be based on a duration the engine has been under extended idle conditions and the temperature of the exhaust gas during the idle conditions.

After the duration has passed, the routine proceeds to 314 and the exhaust gas temperature is increased to a second temperature such that particulate filter regeneration is initiated. The second temperature is a higher temperature than the first temperature. As a non-limiting example, the second temperature may be 600° C. The exhaust gas temperature may be increased to the second temperature by adjusting on or more operating parameters. For example, the engine speed may be increased or spark timing and/or fuel injection may be adjusted. As another example, a number of fuel injection events may be increased. For example, the number of injection events may be increased from one or two injection events to three or five injection events (e.g., close-post injection and far-post injection, respectively) during one combustion event. In some examples, at least two operating parameters may be adjusted to increase the exhaust gas temperature to the second temperature. For example, the engine speed may be increased and fuel injection may be retarded. In other examples, only one operating parameter may be adjusted. As an example, the fuel injecting timing may be further retarded from the fuel injection timing adjustment to achieve the first exhaust gas temperature. If only one operating parameter is adjusted, it may be the same or a different operating parameter than the operating parameter adjusted to achieve the first exhaust gas temperature.

Turning back to 302, if it is determined that the engine is not under continued idle conditions, the routine moves to 316 and the soot loading of the particulate filter is determined. The soot loading may be determined based on soot sensor output or a pressure drop across the particulate filter, for example. In some examples, if it is determined that the engine is not under continued idle conditions, a vehicle in which the engine is positioned may begin to be driven, for example.

Once the soot loading is determined, it is determined if the soot loading is greater than a threshold loading. The threshold loading may be a maximum amount of soot accumulation in the particulate filter, for example. If it is determined that the soot loading is not greater than the threshold loading, the routine moves to 320 and current operation is continued.

On the other hand, if it is determined that the soot loading is greater than the threshold loading, the routine moves to 314 and the exhaust gas temperature is increased to the second temperature to initiate regeneration of the particulate filter, as described above. As such, when the engine is not under continued idle conditions, such as extended cold idle conditions, when particulate filter regeneration is automatically requested, or triggered, by the system, the hydrocarbon desorption process is not carried out. Thus, the exhaust gas temperature does not remain at the first temperature for a duration before it is increased to the second temperature for particulate filter regeneration.

Thus, a hydrocarbon desorption process may be carried out to remove hydrocarbons from the particulate filter first, before regenerating the particulate filter when the engine is under extended cold idle conditions. In this way, the hydrocarbons are removed before the exhaust gas temperature gets high enough that the hydrocarbons may burn resulting in degradation of one or more components of the exhaust gas treatment system. Further, when the engine is not under extended cold idle conditions, particulate filter regeneration is carried out without first removing hydrocarbons from the particulate filter.

Figure 4:
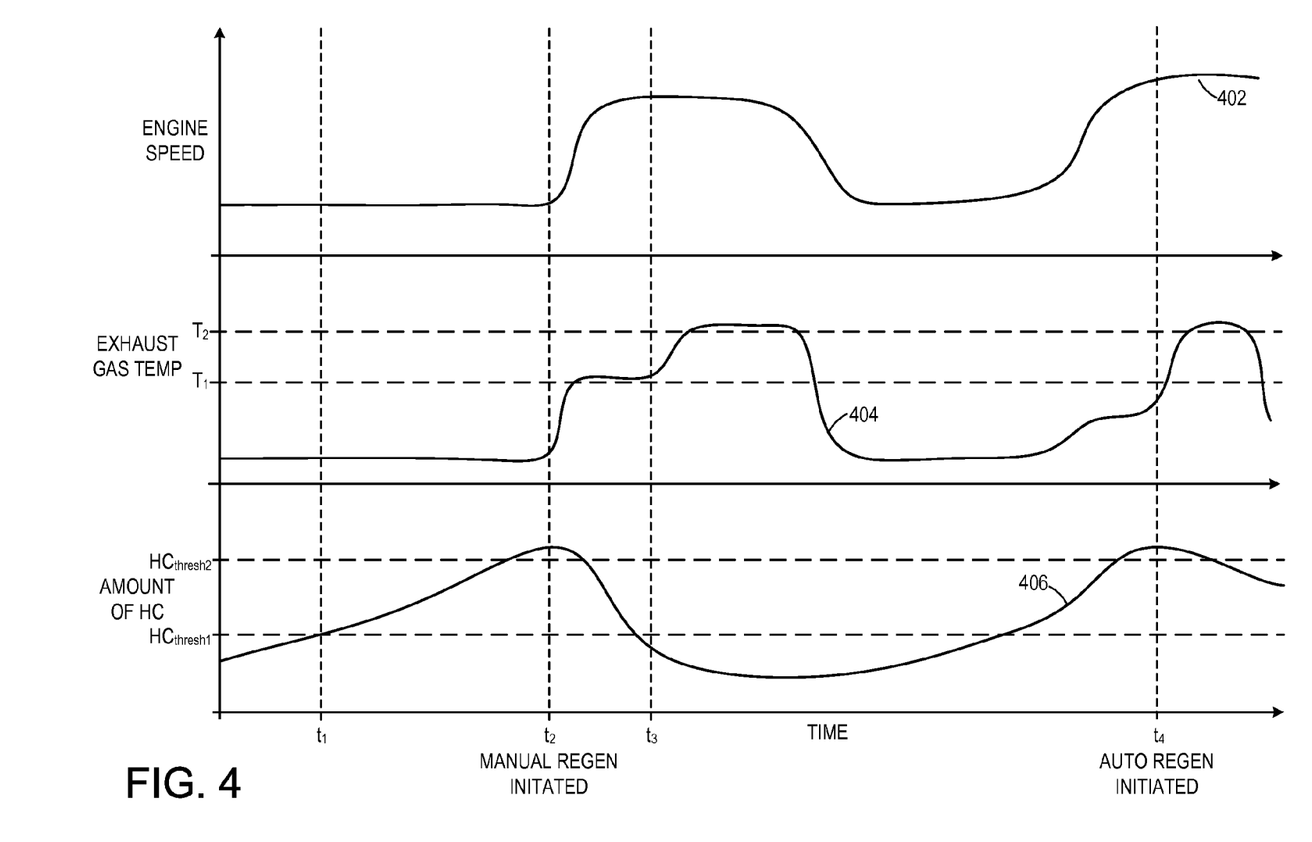
FIG. 4-6 shows series of graphs illustrating various particulate filter regeneration scenarios with respect to engine speed, exhaust temperature, and amount of hydrocarbons stored in a particulate filter.
Figure 5:
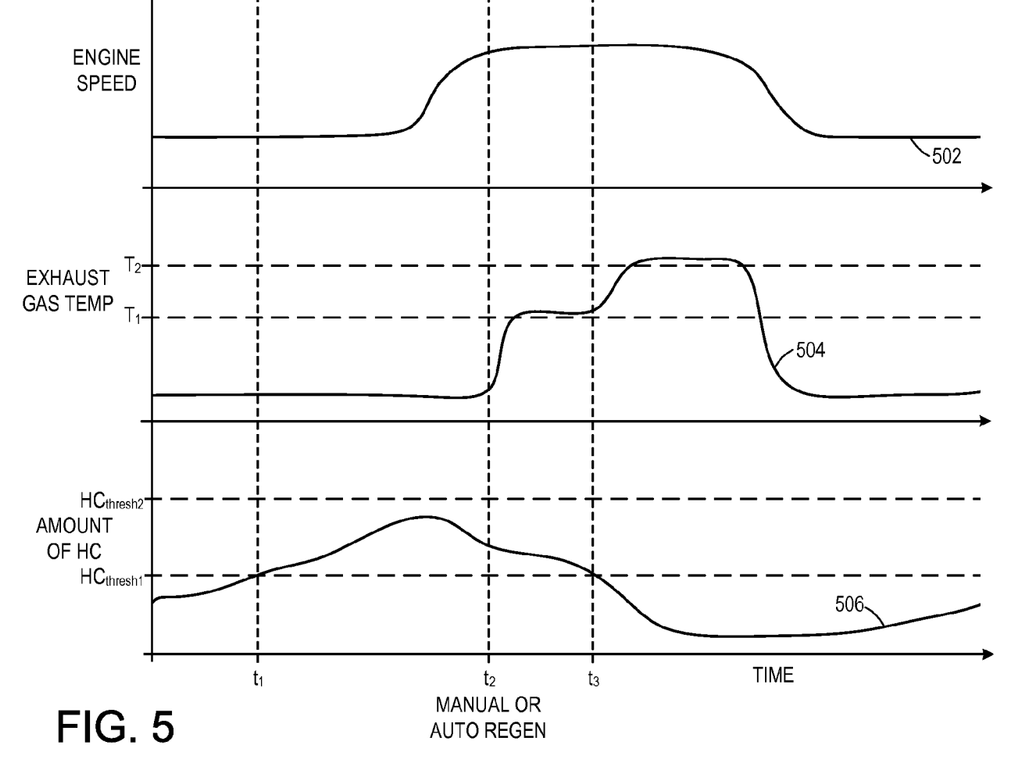
Figure 6:
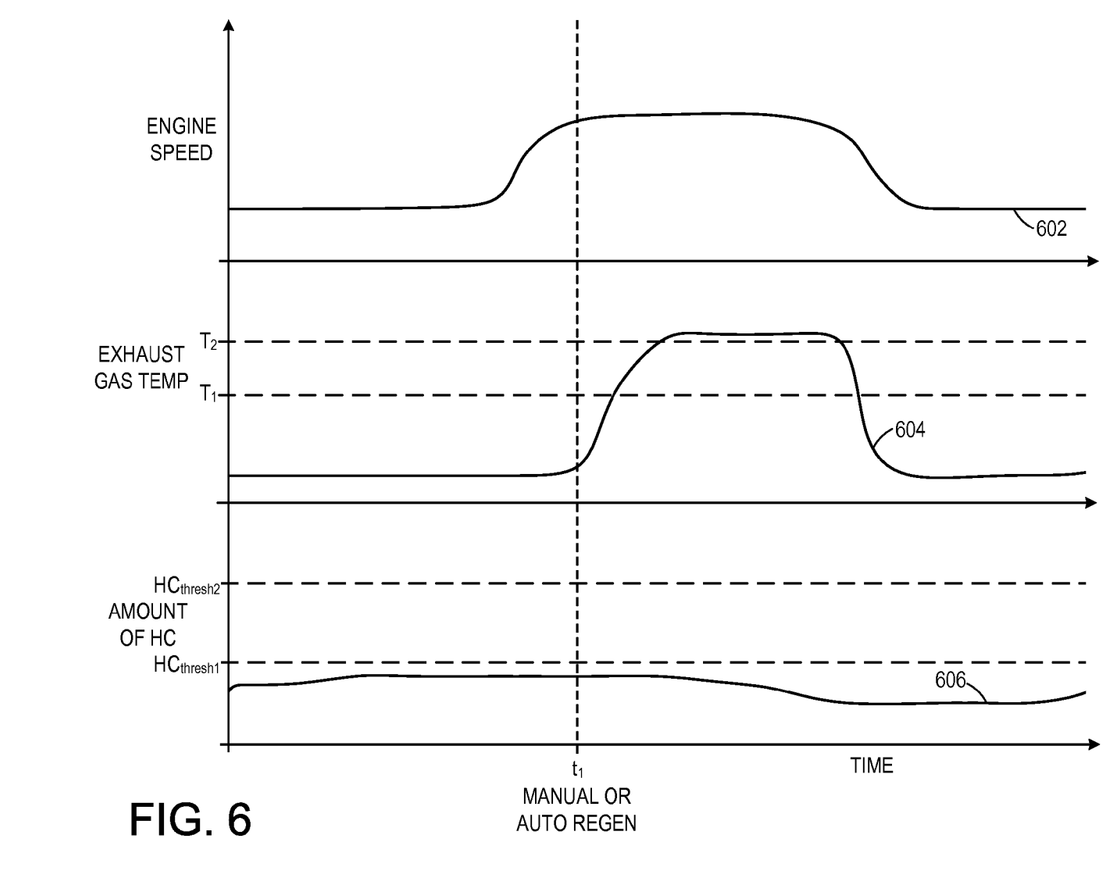

FIG. 4-6 show series of graphs illustrating various regeneration scenarios with respect to engine speed, exhaust gas temperature, and amount of hydrocarbons stored in a particulate filter over time. As depicted in FIG. 4, the amount of hydrocarbons 406 increases over time during while the engine speed 402 is at an idle speed and the exhaust gas temperature 404 is relatively low. At a time $t_1$, the amount of hydrocarbons 406 exceeds a first threshold amount ($HC_{thresh1}$), such as the first threshold amount described above with reference to FIG. 2, and a flag is set indicating a hydrocarbon desorption process should be carried out when regeneration is requested. When the amount of hydrocarbons 406 exceeds a second threshold amount ($HC_{thresh2}$), such as the second threshold amount described above with reference to FIG. 3, particulate filter regeneration is requested and initiated at a time $t_2$. For example, the regeneration request may be a manual regeneration request. Responsive to the regeneration request, the exhaust gas temperature 404 is increased to a first temperature $T_1$ for a duration such that the hydrocarbons may be desorbed. After the duration, at a time $t_3$, the exhaust gas temperature 404 is increased to a second temperature $T_2$ such that particulate filter regeneration is carried out.

At a time $t_4$, an automatic regeneration request is received. Because the engine is no longer under extended cold idle conditions, responsive to the automatic regeneration request, the exhaust gas temperature is increased to the second temperature $T_2$ without remaining at the first temperature $T_1$ for a predetermined duration.

FIG. 5 shows a scenario in which the amount of hydrocarbons 506 exceeds the first threshold amount, but not the second threshold amount. For example, at a time $t_1$, when the engine speed 502 is at continued idle, the first threshold amount is exceeded and a flag is set indicating that hydrocarbon desorption should be carried out prior to a subsequent regeneration. At a time $t_2$, manual or auto regeneration is initiated. In the example of FIG. 5, the regeneration may be initiated based on amount of soot loading in the particulate filter, as the amount of hydrocarbons does not exceed the second threshold amount. At the time $t_2$, the exhaust gas temperature 504 is increased to a first temperature $T_1$, such that hydrocarbon desorption is carried out before the exhaust gas temperature is increased to a second temperature $T_2$ at a time $t_3$ for regeneration of the particulate filter.

FIG. 6 shows a scenario in which the amount of hydrocarbons 606 does not exceed the first threshold amount or the second threshold amount when the engine speed 602 is at continued idle. As such, based on soot loading, for example, manual or auto regeneration is initiated at a time $t_1$ by increasing the exhaust gas temperature 604 to the second temperature $T_2$ without first increasing the exhaust gas temperature 604 to the first temperature $T_1$, and hydrocarbon desorption is not carried out.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method, comprising:
in response to extended cold idle operation, and in response to a particulate filter regeneration request, first removing hydrocarbons stored in a particulate filter, and then performing particulate filter regeneration, wherein increasing a temperature of exhaust gas includes increasing engine speed, retarding fuel injection timing, and increasing a number of fuel injection events.

2. The method of claim 1, wherein removing the hydrocarbons includes increasing a temperature of exhaust gas to a first temperature, but below a second temperature, for a predetermined duration.

3. The method of claim 2, wherein the first temperature is between 250 and 350° C.

4. The method of claim 2, wherein the predetermined duration is based on a duration of the idle operation and an exhaust gas temperature during the idle operation.

5. The method of claim 1, further comprising, in response to a manual particulate filter regeneration request not received during extended cold idle operation, performing the particulate filter regeneration without removing the hydrocarbons stored in the particulate filter.

6. The method of claim 1, further comprising estimating an amount of the hydrocarbons stored in the particulate filter based on a duration of the idle operation and an exhaust gas temperature during the idle operation.

7. The method of claim 1, wherein extended cold idle operation includes operating an engine at a speed below a threshold speed with an exhaust gas temperature less than a threshold temperature for a duration greater than a threshold duration.

8. A method, comprising:
responsive to a manual request for particulate filter regeneration, when an amount of hydrocarbons stored in a particulate filter positioned in an exhaust system of an engine exceeds a threshold amount and the engine is under extended cold idle conditions, increasing an exhaust gas temperature to a first temperature, but below a second temperature; and
after a predetermined duration at the first temperature, increasing the exhaust gas temperature to the second temperature to initiate regeneration of the particulate filter.

9. The method of claim 8, wherein the threshold amount of hydrocarbons is based on a duration of the idle conditions and an exhaust gas temperature during the extended cold idle conditions.

10. The method of claim 8, wherein the predetermined duration is based on the amount of hydrocarbons stored in the particulate filter.

11. The method of claim 8, further comprising, responsive to a manual request for particulate filter regeneration when the engine is not under extended cold idle conditions, increasing the exhaust gas temperature to the second temperature to initiate regeneration of the particulate filter without keeping the exhaust gas temperature at the first temperature for the predetermined duration.

12. The method of claim 8, wherein increasing the exhaust gas temperature to the first temperature includes increasing engine speed.

13. The method of claim 8, wherein increasing the exhaust gas temperature to the second temperature includes increasing engine speed and retarding fuel injection timing.

14. The method of claim 8, wherein the threshold amount of hydrocarbons corresponds to a loading of the particulate filter.

15. The method of claim 8, wherein the first temperature is between 250 and 350° C., and the second temperature is 600° C.

16. A system, comprising:
an engine with an exhaust passage;
an exhaust treatment system disposed in the exhaust passage including at least a particulate filter; and
a controller including non-transitory instructions to increase a temperature of exhaust gas from the engine to a first temperature when an amount of hydrocarbons exceeds a threshold amount and the engine is under extended cold idle conditions; to increase the temperature of the exhaust gas to a second, higher temperature after a predetermined first duration; and to increase the temperature of the exhaust gas to the second temperature responsive to a regeneration request when the engine is not under extended cold idle conditions.

17. The system of claim 16, wherein the threshold amount of hydrocarbons corresponds to a loading of the particulate filter.

18. The system of claim 16, further comprising instructions to retard fuel injection timing to increase the temperature of the exhaust gas to the first temperature.

19. The system of claim 16, further comprising instructions to increase engine speed and retard fuel injection timing to increase the temperature of the exhaust gas to the second temperature.

* * * * *